United States Patent
Kentley-Klay et al.

(10) Patent No.: US 10,317,897 B1
(45) Date of Patent: Jun. 11, 2019

(54) WEARABLE FOR AUTONOMOUS VEHICLE INTERACTION

(71) Applicant: Zoox, Inc., Menlo Park, CA (US)

(72) Inventors: Timothy David Kentley-Klay, Stanford, CA (US); Karen Kaushansky, Menlo Park, CA (US); Vincent Mamo, Menlo Park, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 15/353,685

(22) Filed: Nov. 16, 2016

(51) Int. Cl.
| | | |
|---|---|---|
| *G05D 1/00* | (2006.01) | |
| *B60R 16/037* | (2006.01) | |
| *G06F 3/01* | (2006.01) | |
| *G06F 3/041* | (2006.01) | |

(52) U.S. Cl.
CPC ......... *G05D 1/0016* (2013.01); *B60R 16/037* (2013.01); *G05D 1/0088* (2013.01); *G06F 3/011* (2013.01); *G06F 3/017* (2013.01); *G06F 3/041* (2013.01)

(58) Field of Classification Search
CPC .. G05D 1/0016; G05D 1/0088; G05D 1/0027; G05D 1/0033; G05D 1/0011; G05D 1/0022; G05D 1/005; G05D 1/0044; B60R 16/037; G06F 3/017; G06F 3/0487; G06F 3/0488; G06F 3/014; G06F 1/163; B60W 40/08; B06F 3/011; B06F 3/017; B06F 3/041
USPC ............................................. 701/22, 23, 45
See application file for complete search history.

(56) References Cited

U.S. PATENT DOCUMENTS

| | | | | |
|---|---|---|---|---|
| 2014/0309805 A1* | 10/2014 | Ricci | ....................... | H04W 4/21 701/1 |
| 2015/0149018 A1* | 5/2015 | Attard | .................. | G05D 1/0061 701/23 |
| 2016/0027307 A1* | 1/2016 | Abhyanker | ............ | G08G 1/005 701/117 |
| 2016/0096531 A1* | 4/2016 | Hoye | .................... | B60W 50/14 701/23 |
| 2016/0313869 A1* | 10/2016 | Jang | ...................... | G06F 3/0481 |
| 2016/0358453 A1* | 12/2016 | Wassef | ................. | G08B 25/016 |
| 2016/0358479 A1* | 12/2016 | Riedelsheimer | ........ | H04L 67/12 |
| 2016/0378112 A1* | 12/2016 | Ljubuncic | ............. | B60W 30/16 701/45 |
| 2017/0074641 A1* | 3/2017 | Tschirhart | ............ | G01B 11/002 |
| 2017/0090475 A1* | 3/2017 | Choi | .................... | A61B 5/0059 |
| 2017/0123422 A1* | 5/2017 | Kentley | ............. | B60H 1/00735 |

(Continued)

OTHER PUBLICATIONS

U.S. Appl. No. 62/302,889, filed Mar. 2016, Gao.*

*Primary Examiner* — Richard A Goldman
(74) *Attorney, Agent, or Firm* — Lee & Hayes, P.C.

(57) ABSTRACT

An aesthetically pleasing discreet wearable system for interacting with a vehicle, or fleet of vehicles. The wearable system may be worn as a necklace, bracelet, anklet, or the like and allows for communication between a passenger and a vehicle, or fleet of vehicles. A passenger may summon or cancel a ride, alter interior lighting and music levels, or otherwise control a vehicle by interacting with the wearable system. Such interaction includes signals generated by a microphone, by a touch sensor, or by gesture recognition. The wearable system communicates to the passenger a successful summoning of a ride, successfully canceling a ride, and a time to arrival by combinations of vibrations, light emissions, and audio alerts.

20 Claims, 5 Drawing Sheets

(56) References Cited

U.S. PATENT DOCUMENTS

| | | | |
|---|---|---|---|
| 2017/0151959 A1* | 6/2017 | Boesen | A61B 5/18 |
| 2017/0153636 A1* | 6/2017 | Boesen | G06F 1/163 |
| 2017/0153714 A1* | 6/2017 | Gao | G06F 3/017 |
| 2017/0158202 A1* | 6/2017 | Yang | B60W 40/08 |
| 2017/0214760 A1* | 7/2017 | Lee | H04L 67/2814 |
| 2017/0235935 A1* | 8/2017 | Song | G06F 21/32 |
| | | | 726/19 |
| 2017/0243490 A1* | 8/2017 | Leppanen | B60Q 1/50 |
| 2017/0244937 A1* | 8/2017 | Meier | H04N 5/23216 |
| 2017/0267254 A1* | 9/2017 | Leppanen | B60W 30/00 |
| 2017/0267256 A1* | 9/2017 | Minster | G01C 21/3461 |

* cited by examiner

US 10,317,897 B1

WEARABLE FOR AUTONOMOUS VEHICLE INTERACTION

BACKGROUND

Transporting a passenger from one geographic location to another can be arranged by a taxi service, or the like. Arranging the transportation requires summoning a ride from a vehicle, and instructing the vehicle of a pick-up and drop-off locations.

When summoning a ride, such as a taxi, a majority of services require a passenger to be standing and waiting on a curb to generate a ride request. Some new services allow a passenger to summon a ride using a smartphone and further allow the passenger to input a destination before the summoned ride arrives. These methods, however, do not provide a discreet and aesthetically pleasing wearable device for interacting with a vehicle, or fleet of vehicles. Additionally, these existing techniques can be complex and require multiple steps in order to summon a vehicle.

BRIEF DESCRIPTION OF THE DRAWINGS

The Detailed Description is described, by way of example, with reference to the accompanying drawings, where like numerals denote like elements and in which.

DETAILED DESCRIPTION

Figure 1:
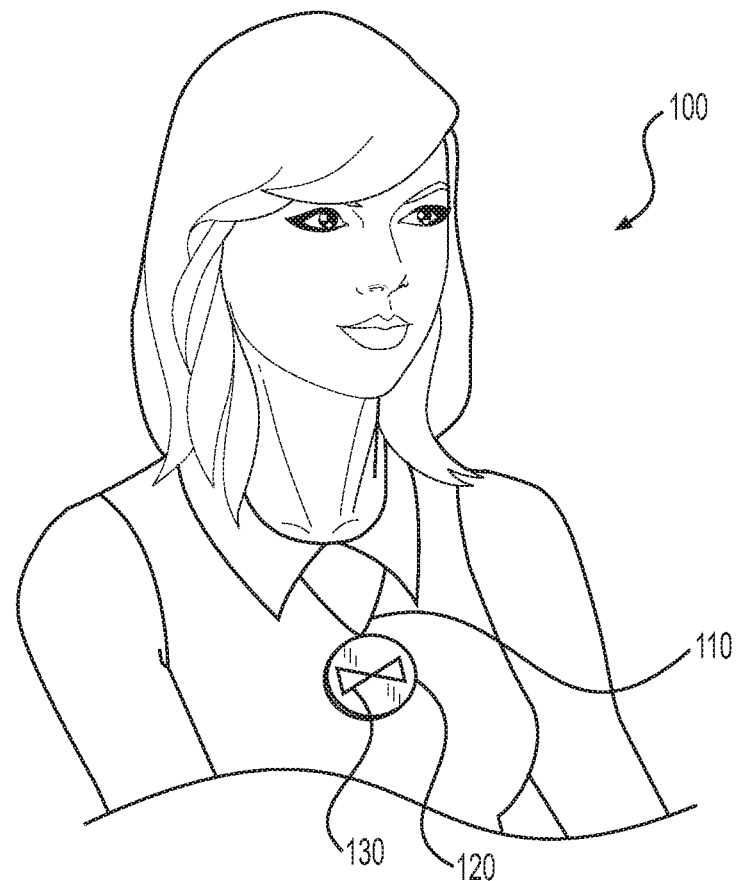
FIG. 1 illustrates an example of a wearable system.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the background, brief description of the drawings, or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The following detailed description is directed to technologies for wearable systems which enable communication directly or indirectly between a passenger and a vehicle, or fleet of vehicles. Additionally, these vehicles may be semi- or fully autonomous vehicles such that the vehicles themselves interact with passengers via the wearable system. The wearable system described in detail below provides a discreet, yet aesthetically pleasing device for communication between a passenger and a vehicle, or fleet of vehicles. For example, a passenger wearing the wearable system as a bracelet or necklace may send information to a vehicle or fleet of vehicles by subtle interaction with the wearable system. As non-limiting examples, passenger input signals generated by touch sensors or by gesture recognition on the wearable system, a passenger may summon a ride, cancel a ride, and alter lighting or music in the vehicle. The wearable system may be intuitive and easy to use. In some examples, a passenger may summon or otherwise interact with the vehicle using a single control operation (e.g., touch, gesture, etc.).

Additionally, a passenger communication signal received by the wearable system may be communicated to the passenger by, for example, vibrations, light emissions, and/or audio signals emitted from the wearable system. In some embodiments, the wearable device may communicate to the passenger by tactile feedback (for example using piezoelectrics or other haptics). As non-limiting examples, these communications may be distinct combinations of vibration signals, light emissions, or audio alerts to communicate to the passenger successful summoning of a ride, successful cancelation of a ride, notification that a vehicle may be passing, an expected time until the summoned vehicle arrives, etc. More details are provided below with reference to FIGS. 1-6.

Wearable Design

FIG. 1 illustrates a discreet and aesthetically pleasing wearable system 100 for enabling a passenger to communicate with a vehicle or fleet of vehicles. As illustrated in FIG. 1, in one embodiment, such a wearable system 100 is in the form of a necklace 110. As shown, the necklace has a pendant 120 which contains various components for enabling the passenger and vehicle or fleet of vehicles to communicate with one another. In one embodiment, the pendant 120 displays at least one light emitter, such as, but not limited to, an LED. Additionally, or alternatively, the light emitter is in the form of a specific design or logo, such as logo 130. Though not pictured in FIG. 1, the wearable system 100 additionally, or alternatively, comprises one or more vibrating elements, and/or one or more audio emitters, or speakers. The light emitters, and/or vibrating elements, and/or audio emitters may generally be referred to as notification elements as they provide notification to a wearer of various information regarding a vehicle. Such information may include, but is not limited to, successfully summoning a ride, successfully canceling a ride, or an amount of time until an arrival of a vehicle. Additionally, or in the alternative, the wearable system 100 may include one or more sensors, such as, but not limited to, touch sensors, IMUs, gyroscopes, magnetometers, barometers, microphones, thermometers, and GPS receivers. As will be discussed in detail below, unique combinations of signals created by such sensors may be relayed via the wearable system 100 to a vehicle to perform some function. As non-limiting examples, the function may be to summon a ride or cancel a ride from a vehicle.

Figure 2:
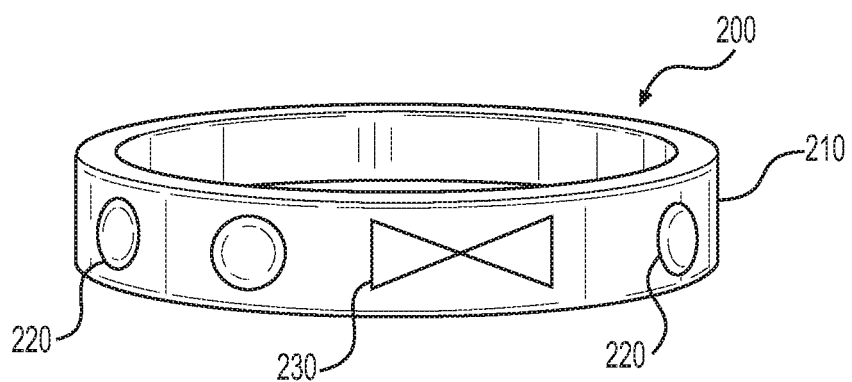
FIG. 2 illustrates an additional example of a wearable system.

FIG. 2 illustrates an alternative embodiment of the discreet and aesthetically pleasing wearable system 200. As depicted in FIG. 2, the wearable system 200 is shaped and configured to be worn as a bracelet 210, or an anklet. As in the embodiment illustrated in FIG. 1, the wearable system 200 comprises one or more notification elements. For example, as further shown in FIG. 2, the wearable system 200 comprises one or more light emitters 220. Additionally, or alternatively, one or more of the light emitters 220 is configured to be in the form of a specific design or logo, such as logo 230. In one embodiment, though not depicted in this figure, the wearable system 200 includes one or more vibrating elements and/or one or more audio elements.

Although illustrated in FIGS. 1 and 2 as a necklace and a bracelet/anklet, the wearable system may be configured in various other forms, such as, for example, watches, glasses, pins/broches, cufflinks, earrings, or rings, though other forms are contemplated.

Passenger Interaction

Figure 3:
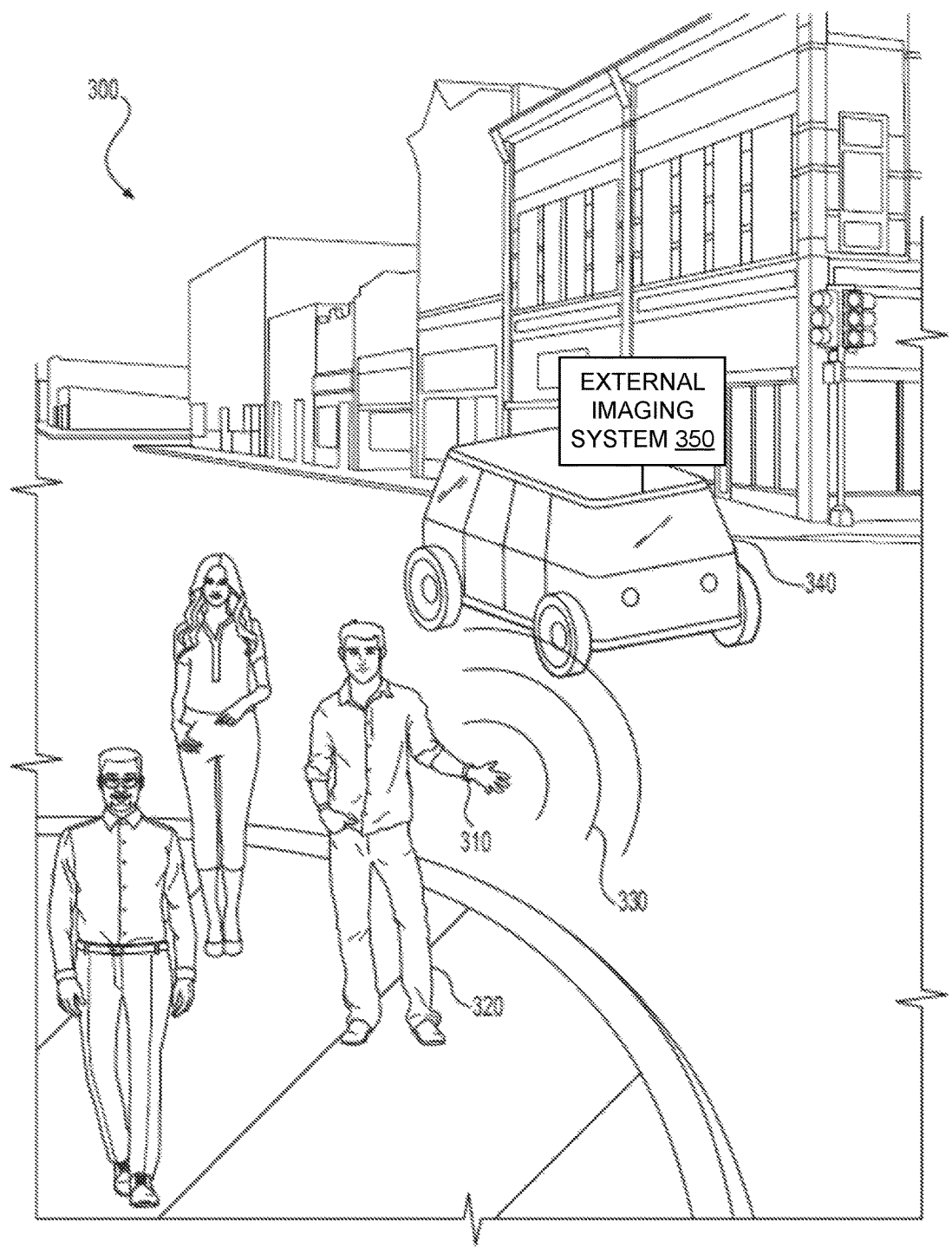
FIG. 3 is a depiction of a wearable system as illustrated in FIG. 2 interacting with a vehicle.

FIG. 3 illustrates an example interaction 300 of a passenger 320 with a vehicle 340 using a wearable system 310. Such a system allows the passenger 320 to very easily interact with a vehicle 340. For example, the passenger 320 may summon the vehicle 340 with a single control input (e.g. a touch, a gesture, a voice command, or the like). As shown, the passenger 320 is wearing the wearable system 310 on his wrist as a bracelet. As will be discussed in further detail below, the wearable system 310 is embedded with a communication module. The communication module of the wearable system 310 is used to provide wireless communications 330 between a vehicle 340, or fleet of vehicles, and a passenger 320. In order to relay messages from the passenger 320 to the vehicle 340, the wearable system 310 comprises at least one input device capable of generating a passenger input signal. In one embodiment, the input device is a touch sensor, such as a pressure sensor, capacitive touch sensor, resistive touch sensor, or inductive touch sensor. In such an embodiment, the touch sensor of wearable system 310 allows the passenger 320 to communicate with the vehicle 340 by touching a region on the wearable system 310 associated with the touch sensor to create a touch signal. Differing passenger input signals are generated based on different touch inputs provided by the passenger 320. For instance, one passenger input signal may comprise a long press (e.g. longer than three seconds) by the passenger 320. As additional examples, a different passenger input signal may comprise multiple presses or various combinations of long and short presses (e.g. presses longer and shorter than, for example, three seconds), tracing an outline of a logo on the wearable system 310, though other touch signals are contemplated.

In one or more embodiments, the wearable system 310 comprises a microphone. In those embodiments, the microphone is used to capture an audio passenger input signal. The audio input signal may be, for example, a verbal command, such as "Request Zoox", or a whistle at a specific frequency or for a specific duration.

Additionally, or in the alternative, the wearable system 310 also comprises one or more sensors, such as, for example, an inertial measurement unit (IMU), which may include a gyroscopic sensor and/or a magnetometer, thermometer, barometer, and a GPS receiver. Such sensors can be used to perform gesture recognition and output a passenger input signal. As non-limiting examples, such passenger input signals may be representative of a how a passenger 320 would typically hail a vehicle and, as such, are indicative of a twisting of the wrist and/or an extension of the arm, though other gesture signals are contemplated. As a non-limiting example, the passenger input signal may be indicative of the passenger 320 clapping a predefined number of times.

In one embodiment, light emitters on the wearable system 310 serve as fiducials to an imaging system on the vehicle 340 (e.g., an external imaging system 350). One or more of the light emitters may operate in various frequencies that are only visible to the imaging system on the vehicle 340 and not to the passenger 320 such as, for example, infrared. In other examples, however, light in the visible range may additionally or alternatively be used. Imaging systems onboard the vehicle 340 track the fiducials to perform gesture recognition and output a passenger input signal. As above, such passenger input signals may be indicative of a twisting of the wrist or an extension of the arm, though other gesture signals are contemplated.

Each of the passenger input signals (whether from touch sensors or gesture recognition, or both) is then mapped to one or more functions. Functions are then communicated to the vehicle 340, or fleet management system, for processing. As non-limiting examples, functions include summoning a ride, canceling a ride, raising the volume in the vehicle 340, lowering the volume in the vehicle 340, changing a music source in the vehicle 340, increasing a lighting level in the vehicle 340, decreasing a lighting level in vehicle 340, or communicating a preferred pick-up location to the vehicle 340, changing a ride profile (e.g., suspension stiffness, rate of acceleration/deceleration, etc.) of the vehicle 340, though other functions are contemplated. As a non-limiting example of a mapping from signals to functions, a passenger input signal comprising a long press (e.g. longer than three seconds) may be mapped to summoning a ride such that when a passenger 320 touches the wearable system 310 for longer than a certain time, for example three seconds, a message is sent to the fleet service to send the vehicle 340 to pick up the passenger. In those embodiments where the passenger input signal is generated by the vehicle 340 tracking fiducials, mapping from the passenger input signal to a function may be performed by the vehicle 340 such that the wearable system 310 need not communicate the function to the vehicle 340.

In one embodiment, which will be discussed in further detail below, the wearable system 310 is paired with an electronic device, such as a smartphone. In such an embodiment, additional information available to the smartphone is communicated to the vehicle 340 or fleet management system. As a non-limiting example, the additional information may include a GPS coordinate available from a GPS receiver onboard the electronic device. In one embodiment, information stored in a database on the electronic device, or on a database accessible over a network available to the electronic device, is conveyed to the vehicle 340 or fleet management system. Such information may comprise payment information, such as, but not limited to, credit card data, as well as passenger preference information, such as, but not limited to, preferred lighting levels, preferred audio levels, preferred music, preferred routes, preferred ride profiles, and a preferred destination address, though other information is contemplated. The information may be conveyed, for example, upon summoning a ride, when the passenger 320 is within a threshold distance of the vehicle 340, or when a ride is complete.

In those embodiments where information is stored on a database accessible over the network, information associated with the passenger 320 may have a unique identifier code. In order to retrieve such information, the wearable system 310 may transmit the unique identifier code to the vehicle 340 or fleet management system. In some embodiments, the unique identifier code may be associated with the face of a passenger 320 such that a vehicle 340 may retrieve the unique identifier code based, at least in part, on facial recognition performed by cameras onboard the vehicle 340. The unique identifier code is then used to retrieve the information about the passenger 320 from the database Passenger Notification As above, the wearable system 310 may also be used to convey information from the vehicle 340 or fleet management system to the passenger 320. Information may be included in a passenger communication signal, as originally generated by a vehicle 340, such that when received by the wearable system 310, one or more of the notification elements are activated so as to notify a passenger 320 of some information regarding the vehicle 340.

As a non-limiting example, the wearable system 310 is used to summon a ride from the vehicle 340, or cancel the ride from the vehicle 340. If the vehicle 340 is functioning, unoccupied, and otherwise available to pick up passenger 320, the vehicle 340 may respond with a passenger communication signal indicating a successful summoning. Similarly, the vehicle 340 may respond with a passenger communication signal indicative of successfully cancelling a ride. Successfully summoning or cancelling the ride may be communicated to the passenger 320 by activating the one or more notification elements so as to produce a series of vibrations and/or light signals and/or audio alerts. As a non-limiting example, a successful summoning of a ride may be conveyed to the passenger as a series of three long vibrations, whereas a cancellation of a ride may be indicated to the passenger 320 as three short vibrations. Similarly, in some embodiments, an alternate pattern of alerts may be communicated to a passenger when summoning or cancelling a ride is unsuccessful.

In one embodiment, the wearable 310 may provide several forms of notification to the passenger 320 to alert the passenger 320 of the approach of the vehicle 340. For example, the wearable system 310 may vibrate a number of times equal to the number of minutes until the vehicle 340 is scheduled to arrive. As a non-limiting example, a passenger communication signal sent from the vehicle 340 to the wearable system 310 causes the notification element to vibrate five times when the vehicle 340 is five minutes away, four times when the vehicle 340 is four minutes away, and so on. Additionally, or in the alternative, the passenger communication signal received by the wearable system 310 causes one or more of the light emitters to display a pattern. As a non-limiting example, the light emitters may flash in the same manner as the vibration pattern. Additionally, or in the alternative, the brightness of the light emitters may be modulated with the time of arrival for the ride. In one embodiment, once the vehicle 340 arrives to pick up the passenger 320, the wearable system 310 communicates an arrival of the vehicle 340 to the passenger 320 as an activation of unique series of vibrations and/or light signals and/or audio alerts on the notification elements. As a non-limiting example, one such unique series includes a vibration lasting for more than five seconds, a light emission which varies sinusoidally in intensity, and an audio tone lasting not more than one second, though any other combination of vibrations, light signals, and/or audio alerts is contemplated. Though not depicted in FIG. 3, the wearable system 310 may also provide haptic or tactile feedback through the use of deformable surfaces, for example, through the use of piezoelectrics.

In another embodiment, the wearable 310 provides more frequent notifications as the vehicle approaches. As a non-limiting example, the wearable system 310 may vibrate once when the vehicle 340 is five minutes away, twice when the vehicle 340 is four minutes away, and so on until the wearable system 310 vibrates five times when the vehicle 340 is one minute away.

In another embodiment, the wearable system 310 provides alerts to the passenger 320 by activating the notification elements in a continuous signal, such that the vibrations and/or light emissions and/or audio alerts have a duty cycle which varies based on an estimated time until arrival for the vehicle 340. As non-limiting examples, such a duty cycle may increase or decrease based on a time until arrival of the vehicle 340.

Passive Communication

In some embodiments, the wearable system 310 relays information to the vehicle 340 or the passenger 320 without any affirmative action by the passenger 320. As a non-limiting example, the wearable system 310 may generate a proximity message. In one embodiment, the proximity message is generated when the wearable system 310 is within a range to directly communicate with the vehicle 340 using a communication module on the wearable system 310, as discussed in detail below. Additionally, or in the alternative, the proximity message is generated when a distance between the vehicle 340 and the passenger 320 is less than some threshold distance, for example one meter. Such a distance may correspond to, for example, GPS coordinates of the vehicle 340 and of the passenger 320.

In one embodiment, such a proximity message is used to indicate to a driver of the vehicle 340 (or the vehicle 340 itself in the event that the vehicle 340 is an autonomous, or semi-autonomous, vehicle) where the passenger 320 is located with respect to the vehicle 340. Additionally, or in the alternative, the proximity message causes the wearable system 310 to perform a combination of vibrations and/or light emissions and/or audio alerts to notify the passenger 320 that the vehicle 340 is near. In some embodiments, the proximity message also contains a command of "unlock doors" such that when a vehicle 340 receives the proximity message doors in the vehicle 340 are unlocked. In some embodiments, the proximity message sent to a vehicle 340 also contains commands to alert a passenger 320 of the presence of the vehicle 340. Some non-limiting examples of such commands include flashing headlights of the vehicle 340, turning on interior lighting of the vehicle 340, sounding an audio alert on the vehicle 340, such as a horn, though other proximity message commands are contemplated.

In any of the above embodiments, such commands associated with the proximity message may be sent regardless of whether the vehicle 340 was summoned. In that manner, a passenger 320 may be made aware of a passing vehicle 340 so that a ride may be summoned upon the vehicle 340 passing. In those embodiments, such commands may only be processed if the vehicle 340 is unoccupied.

Communication Module

Figure 4A:
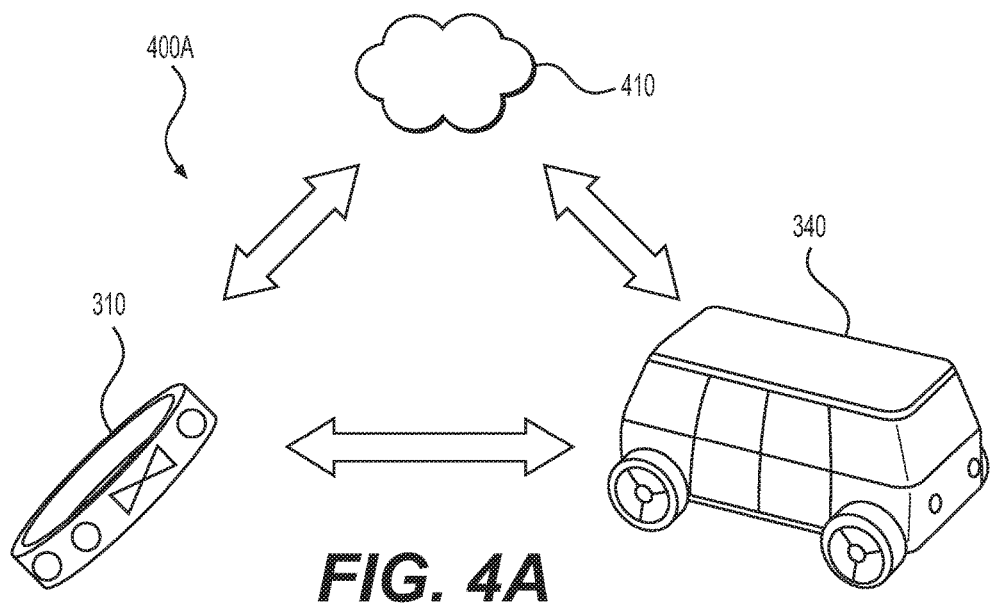
FIG. 4A and FIG. 4B illustrate communication schema of the wearable system.
Figure 4B:
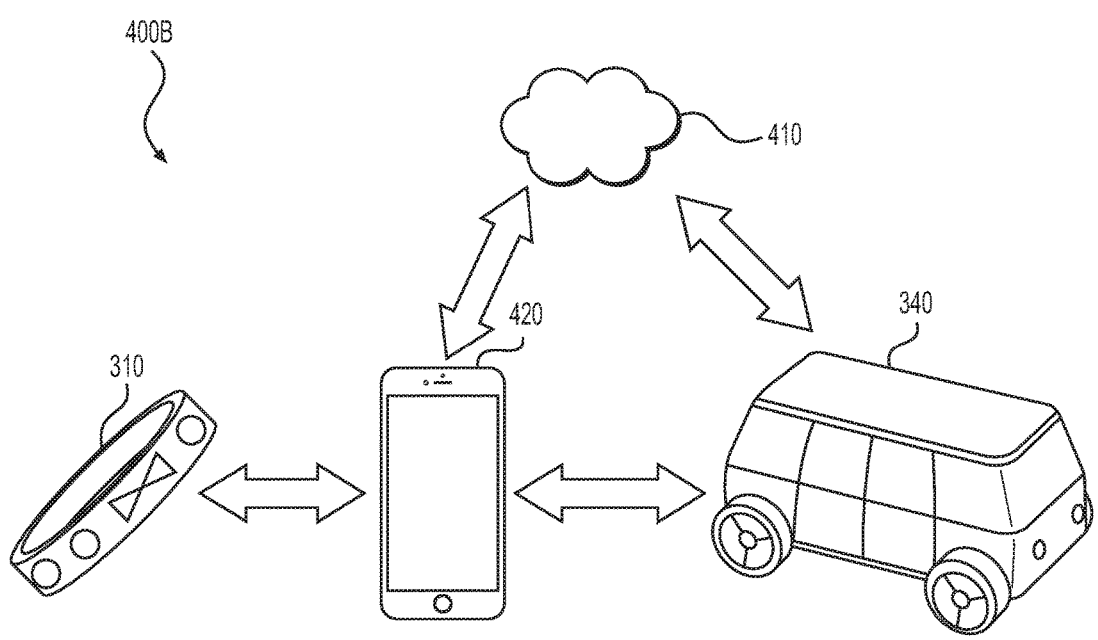

FIGS. 4A and 4B illustrate example embodiments of the communication module. Under communication schema 400A, the communication module allows the wearable system 310 to directly communicate with the vehicle 340 over a wireless protocol, such as, for example, Bluetooth™, Bluetooth™ Low Energy, Near Field Communication (NFC), RFID, Wi-Fi, 3G, 4G, or the like. Alternatively, communication with the vehicle 340 may be through the use of audio signals, whether audible to a human or not, and/or electromagnetic signals, whether visible to a human or not. Additionally, or in the alternative, the communication module of the wearable system 310 may communicate with the vehicle 340 via one or more servers accessible over a network, such as an internet 410. In those embodiments where the one or more servers are part of a fleet management system, instructions on the server may route the information between a particular vehicle 340 and a particular wearable system 310, or between a wearable system 310 and multiple vehicles in a fleet of autonomous vehicles.

In one embodiment, information may be relayed from the wearable system 310 via an electronic device, such as a smartphone 420, as indicated by communication schema 400B. In such an embodiment, the wearable system 310 first pairs with the electronic device, i.e., smartphone 420, so that information is communicated between the wearable system 310 and the smartphone 420 and between the smartphone 420 and vehicle 340. Such pairing may be accomplished using the communication module over a wireless protocol, such as, for example, Bluetooth™, Bluetooth™ Low Energy, Near Field Communication (NFC), RFID, Wi-Fi, 3G, 4G, or the like. Information communicated between wearable system 310 and vehicle 340 is then relayed via the smartphone 420. Information conveyed between smartphone 420 and vehicle 340 may be communicated over a wireless protocol either directly or through one or more servers accessible over an internet 410.

When paired with an electronic device, such as smartphone 420, the wearable system 310 optionally signals communication of additional information available on the smartphone 420 to the vehicle 340, such as, for example, information included on a database located on the smartphone 420 and sensor data from sensors located on the smartphone 420, though other information is contemplated. Additionally, or in the alternative, information communicated from the vehicle 340 via a smartphone 420 to a wearable system 310 may include instructions to be performed on the smartphone 420. As non-limiting examples, such instructions may include playing a media file, making a call, or the like.

Though illustrated as distinct communication schema 400A, 400B in FIGS. 4A and 4B, both schema may be enabled in a single wearable system 310 such that the wearable system 310 may take advantage of additional features of a smartphone 420 when present, yet communicate with a vehicle 340 even when such a smartphone 420 is not present.

In one embodiment, the communication module of wearable system 310 additionally stores and conveys a unique identifier code with every communication. In such an embodiment, the unique identifier code enables retrieval of additional passenger information which may be stored on a database accessible over the internet 410, as well as provides a measure of security to ensure that the wearable system 310 is, in fact, associated with a wearer of such a wearable system 310.

Wearable Architecture

Figure 5:
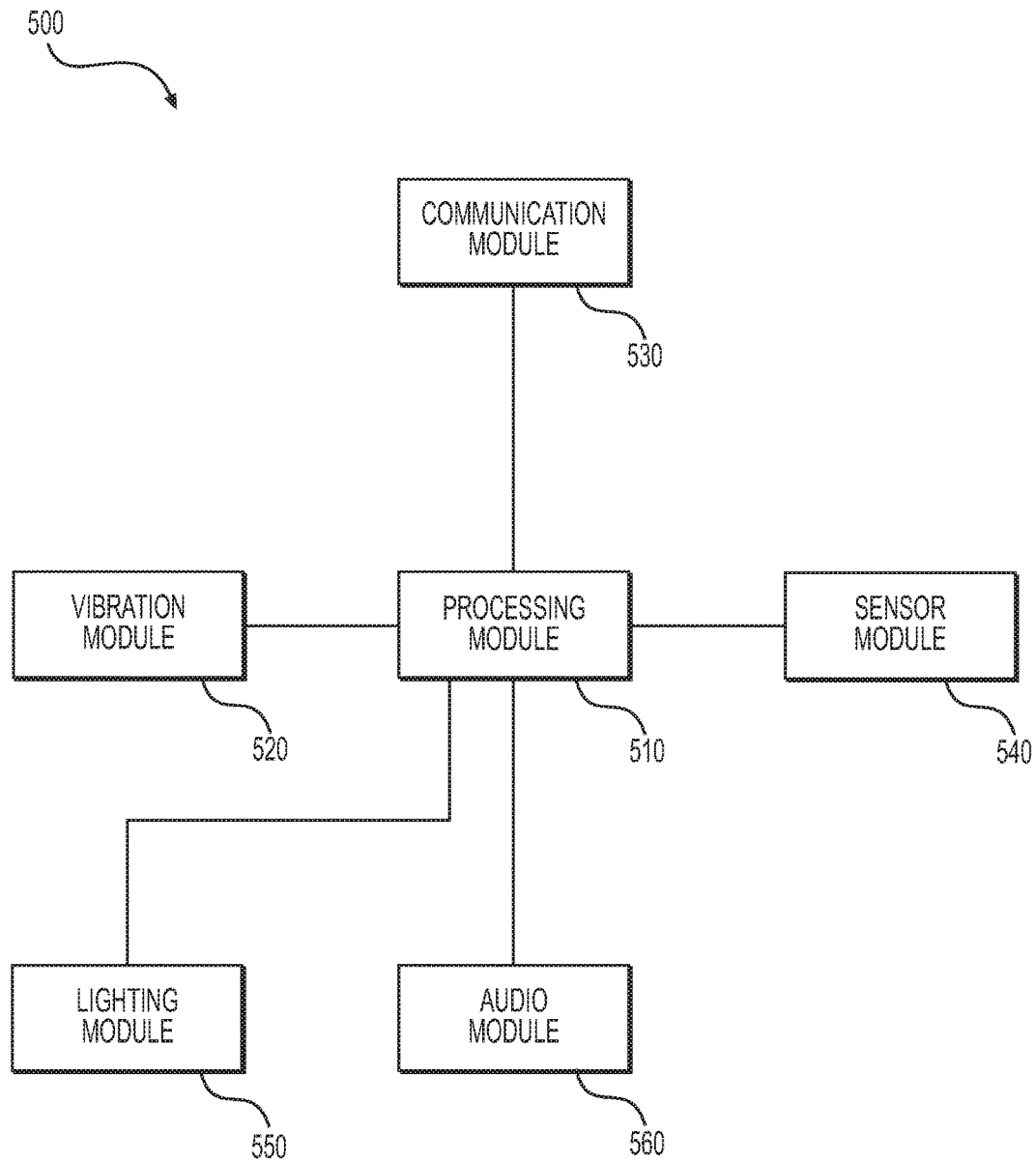
FIG. 5 illustrates a block diagram of the components of the wearable system as illustrated in any of the preceding figures.

FIG. 5 illustrates an architecture 500 for the wearable system as illustrated in any of FIGS. 1-4. As illustrated, a processing module 510 controls features of the wearable system as described in any of the embodiments described above. The processing module 510 may comprise any number of processors, memory, and storage so as to perform instructions as described in any or all of the embodiments. As will be discussed in greater detail below, the processing module 510 is in communication with various modules for input, output, communication, and the like. In some embodiments, as depicted in FIG. 5, the processing module 510 is in communication with at least one of a vibration module 520, a communication module 530, a sensor module 540, a lighting module 550, or an audio module 560, though any number of other configurations, including additional modules, is contemplated. The vibration module 520, lighting module 550, and audio module 560 may generally be referred to as notification modules.

As above, communication module 530 allows the wearable to communicate wirelessly with a vehicle, an electronic device, such as a smartphone, or the like. In one embodiment, the communication module 530 provides a wireless connection directly to a vehicle, or to the vehicle over a network, such as the internet. Additionally, or alternatively, the communication module 530 provides wireless connectivity to the electronic device, otherwise known as pairing. Once paired, the electronic device relays information between the wearable system and the vehicle. In those embodiments where the wearable system is paired with a smartphone using communication module 530, the smartphone may communicate directly with a vehicle or to the vehicle over a network, such as the internet.

In some embodiments, when paired with an electronic device, the wearable system may indicate that additional information available to the electronic device should be communicated to either the vehicle or the wearable system. As non-limiting examples the wearable system may indicate for the electronic device to communicate information stored on a database available to the electronic device or signals from sensors located on the electronic device, such as, but not limited to, GPS, magnetometers, accelerometers, gyroscopes, thermometers, barometers, and the like.

In some embodiments, where the wearable system or smartphone communicates with the vehicle over a network, the communication module may first communicate with a fleet management service. The fleet management service is then able to select a vehicle in the fleet to respond and convey all messages between the passenger and the vehicle. In those embodiments, the fleet management system may select the vehicle to respond based on a variety of factors such as, but not limited to, proximity to the passenger, fuel or range of a vehicle, total number of passengers requesting service, density of passengers requesting service, and the like, though other factors are contemplated.

In one embodiment, wearable architecture 500 includes a sensor module 540. Such a sensor module 540 includes one or more sensors. As non-limiting examples, the sensor module 540 includes a touch sensor. Such a touch sensor may be a pressure sensor, capacitive touch sensor, inductive touch sensor or the like. The touch sensor in sensor module 540 is a passenger input device which outputs touch signals indicative of a passenger touching the wearable system to processing module 510. Unique combinations of touch signals from such a touch sensor are mapped by the processing module 510 to various functions to be performed by a vehicle or fleet management system. For example, in one embodiment, a passenger touching the pressure sensor for a fixed amount of time, for example 3 seconds, is mapped to the function of summoning a ride. Additionally, or alternatively, the same or different touching sequence is mapped to the function of cancelling the ride.

Additionally, or alternatively, sensor module 540 includes an inertial measurement unit (IMU) which may or may not include a gyroscope and/or magnetometer. IMU and/or gyroscope and/or magnetometer measurements provided from these sensors are relayed to the processing module 510 in order to determine a gesture. As a non-limiting example, such a gesture includes a flick of the wrist, a twist of the wrist, and a hand raise, although other gestures are contemplated. Each gesture is mapped by the processing module 510 to a different function to be performed by a vehicle or fleet management system. For example, in one embodiment a hand raise is mapped to the function of summoning a ride from a vehicle, whereas a flick of the wrist is mapped to the function of cancelling a ride. In another example, functions of summoning and cancelling a ride are mapped to the same gesture.

Any combination of touch signals or gesture signals may be mapped to any number of functions. Additionally, other functions contemplated include changing interior lighting of the vehicle, altering a volume of audio in a vehicle, and controlling subsystems within the vehicle, although other functions are contemplated. Once mapped, processing module 510 then communicates the function to be performed to a vehicle or fleet management system via the communication module 530.

In any of the above referenced embodiments, the processing module 510 also communicates information received from communication module 530 to a passenger. Such a communication to the passenger is performed by any combination of a vibration module 520 (having one or more vibrating elements), a lighting module 550 (having one or more light emitting elements), and an audio module 560 (having one or more audio emitting elements). Upon receiving a signal from the communication module 530, the processing module 510 may relay instructions to any combination of the vibration module 520, the lighting module 550, and the audio module 560 so as to create some combination of vibrations, light emissions, and audio alerts. Described in further detail above, non-limiting examples include, but are not limited to, differing numbers of vibrations and/or audio alerts and/or light emissions indicative of an estimated time to arrival, successful summoning or cancelling of a ride, and an arrival of a vehicle.

The Computerized System

Figure 6:
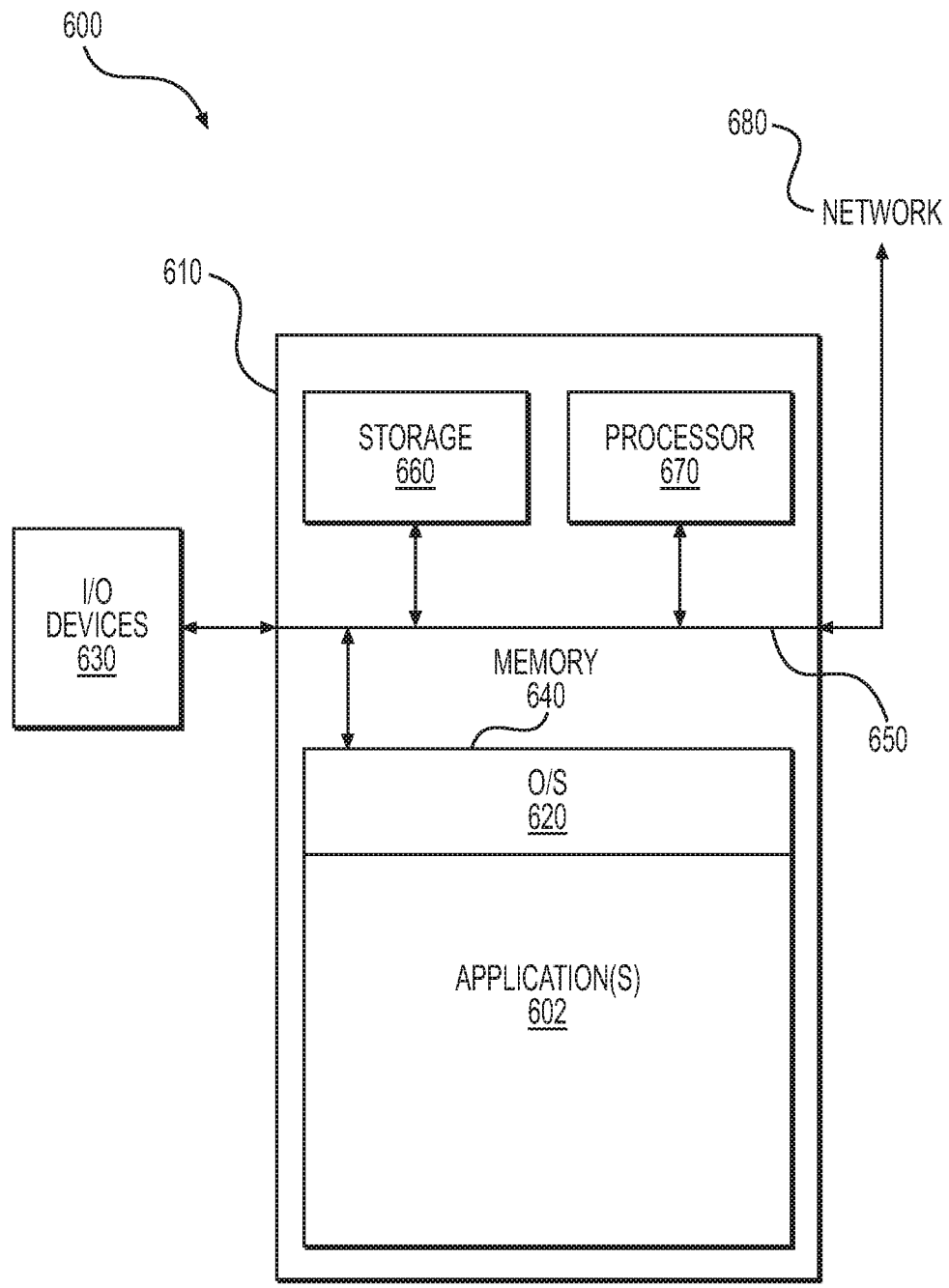
FIG. 6 is a depiction of an example computer system usable to implement aspects of the wearable system.

Turning briefly to FIG. 6, a computerized system 600 is depicted as an example computerized system usable to implement aspects of the wearable system. Though illustrated as a single system, components of the computerized system may, alternatively, be distributed. As a non-limiting example, the computerized system 600 may be used to implement the embodiment as illustrated in FIG. 5. In some embodiments, the computerized system 600 is located on, or in, the wearable itself. In other embodiments, the computerized system 600 may distributed between the wearable system, the autonomous vehicle, and a network server. In some of those embodiments, I/O devices 630 may be located on the wearable system and other components may be located in the vehicle and/or the server. The computerized system 600 depicts a computer system 610 that comprises a storage 660, a processor 670, a memory 640, and an operating system 620. The storage 660, processor 670, memory 640, and operating system 620 may be communicatively coupled over a communication infrastructure 650. Optionally, the computer system 610 may interact with a user (or passenger) via I/O devices 630, as well as a network 680, via the communication infrastructure 650. The operating system 620 may interact with other components to control application 602.

The systems and methods described herein can be implemented in software or hardware or any combination thereof. The systems and methods described herein can be implemented using one or more computing devices which may or may not be physically or logically separate from each other. The methods may be performed by components arranged as either on-premise hardware, on-premise virtual systems, or hosted-private instances. Additionally, various aspects of the methods described herein may be combined or merged into other functions.

An example computerized system for implementing one or more embodiments described above is illustrated in FIG. 6. A processor or computer system can be configured to particularly perform some or all of the method described herein. In some embodiments, the method can be partially or fully automated by one or more computers or processors. One or more embodiments described above may be implemented using a combination of any of hardware, firmware and/or software. The present disclosure (or any part(s) or function(s) thereof) may be implemented using hardware, software, firmware, or a combination thereof and may be implemented in one or more computer systems or other processing systems. In some embodiments, the illustrated system elements could be combined into a single hardware device or separated into multiple hardware devices. If multiple hardware devices are used, the hardware devices could be physically located proximate to or remotely from each other. The embodiments of the methods described and illustrated are intended to be illustrative and not to be limiting. For example, some or all of the steps of the methods can be combined, rearranged, and/or omitted in different embodiments.

The system may include one or more processors. The processor(s) may be connected to a communication infrastructure, such as but not limited to, a communications bus, cross-over bar, or network, etc. The processes and processors need not be located at the same physical locations. In other words, processes can be executed at one or more geographically distant processors, over for example, a LAN or WAN connection. Computing devices may include a display interface that may forward graphics, text, and other data from the communication infrastructure for display on a display unit.

The computer system may also include, but is not limited to, a main memory, random access memory (RAM), and a secondary memory, etc. The secondary memory may include, for example, a hard disk drive and/or a removable storage drive, such as a compact disk drive CD-ROM, etc. The removable storage drive may read from and/or write to a removable storage unit. As may be appreciated, the removable storage unit may include a computer usable storage medium having stored therein computer software and/or data. In some embodiments, a machine-accessible medium may refer to any storage device used for storing data accessible by a computer. Examples of a machine-accessible medium may include, e.g., but not limited to: a magnetic hard disk; a floppy disk; an optical disk, like a compact disk read-only memory (CD-ROM) or a digital versatile disk (DVD); a magnetic tape; and/or a memory chip, etc.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

The processing system can be in communication with a computerized data storage system. The data storage system can include a non-relational or relational data store, such as a MySQL™ or other relational database. Other physical and logical database types could be used. The data store may be a database server, such as Microsoft SQL Server™, Oracle™, IBM DB2™, SQLITE™, or any other database software, relational or otherwise. The data store may store the information identifying syntactical tags and any information required to operate on syntactical tags. In some embodiments, the processing system may use object-oriented programming and may store data in objects. In these embodiments, the processing system may use an object-relational mapper (ORM) to store the data objects in a relational database. The systems and methods described herein can be implemented using any number of physical data models. In one example embodiment, an RDBMS can be used. In those embodiments, tables in the RDBMS can include columns that represent coordinates. In the case of economic systems, data representing companies, products, etc. can be stored in tables in the RDBMS. The tables can have pre-defined relationships between them. The tables can also have adjuncts associated with the coordinates.

In alternative exemplary embodiments, secondary memory may include other similar devices for allowing computer programs or other instructions to be loaded into computer system. Such devices may include, for example, a removable storage unit and an interface. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units and interfaces, which may allow software and data to be transferred from the removable storage unit to computer system.

The computing device may also include an input device such as but not limited to, a mouse or other pointing device such as a digitizer, and a keyboard or other data entry device (not shown). The computing device may also include output devices, such as but not limited to, a display, and a display interface. Computer may include input/output (I/O) devices such as but not limited to a communications interface, cable and communications path, etc. These devices may include, but are not limited to, a network interface card, and modems. Communications interface may allow software and data to be transferred between computer system and external devices.

In one or more embodiments, the present embodiments are practiced in the environment of a computer network or networks. The network can include a private network, or a public network (for example the Internet, as described below), or a combination of both. The network includes hardware, software, or a combination of both.

From a telecommunications-oriented view, the network can be described as a set of hardware nodes interconnected by a communications facility, with one or more processes (hardware, software, or a combination thereof) functioning at each such node. The processes can inter-communicate and exchange information with one another via communication pathways between them using interprocess communication pathways. On these pathways, appropriate communications protocols are used.

An exemplary computer and/or telecommunications network environment in accordance with the present embodiments may include node, which include may hardware, software, or a combination of hardware and software. The nodes may be interconnected via a communications network. Each node may include one or more processes, executable by processors incorporated into the nodes. A single process may be run by multiple processors, or multiple processes may be run by a single processor, for example. Additionally, each of the nodes may provide an interface point between network and the outside world, and may incorporate a collection of sub-networks.

In an exemplary embodiment, the processes may communicate with one another through interprocess communication pathways supporting communication through any communications protocol. The pathways may function in sequence or in parallel, continuously or intermittently. The pathways can use any of the communications standards, protocols or technologies, described herein with respect to a communications network, in addition to standard parallel instruction sets used by many computers.

The nodes may include any entities capable of performing processing functions. Examples of such nodes that can be used with the embodiments include computers (such as personal computers, workstations, servers, or mainframes), handheld wireless devices and wireline devices (such as personal digital assistants (PDAs), modem cell phones with processing capability, wireless email devices including BlackBerry™ devices), document processing devices (such as scanners, printers, facsimile machines, or multifunction document machines), or complex entities (such as local-area networks or wide area networks) to which are connected a collection of processors, as described. For example, a node itself can be a wide-area network (WAN), a local-area network (LAN), a private network (such as a Virtual Private Network (VPN)), or collection of networks. In some embodiments, the vehicles themselves may comprise various computers, processors, and the like. As such, each vehicle in a fleet of autonomous vehicles may comprise one or more nodes.

Communications between the nodes may be made possible by a communications network. A node may be connected either continuously or intermittently with communications network. As an example, a communications network can be a digital communications infrastructure providing adequate bandwidth and information security.

The communications network can include wireline communications capability, wireless communications capability, or a combination of both, at any frequencies, using any type of standard, protocol or technology. In addition, in the present embodiments, the communications network can be a private network (for example, a VPN) or a public network (for example, the Internet).

A non-inclusive list of exemplary wireless protocols and technologies used by a communications network may include BlueTooth™, general packet radio service (GPRS), cellular digital packet data (CDPD), mobile solutions platform (MSP), multimedia messaging (MIMS), wireless application protocol (WAP), code division multiple access (CDMA), short message service (SMS), wireless markup language (WML), handheld device markup language (HDML), binary runtime environment for wireless (BREW), radio access network (RAN), and packet switched core networks (PS-CN). Also included are various generation wireless technologies. Wireless protocols may also include electromagnetic signals, whether visible to a human or not, and/or audio signals, whether audible to a human or not. An exemplary non-inclusive list of primarily wireline protocols and technologies used by a communications network includes asynchronous transfer mode (ATM), enhanced interior gateway routing protocol (EIGRP), frame relay (FR), high-level data link control (HDLC), Internet control message protocol (ICMP), interior gateway routing protocol (IGRP), internetwork packet exchange (IPX), ISDN, point-to-point protocol (PPP), transmission control protocol/internet protocol (TCP/IP), routing information protocol (RIP) and user datagram protocol (UDP). As skilled persons will recognize, any other known or anticipated wireless or wireline protocols and technologies can be used.

Embodiments of the present disclosure may include apparatuses for performing the operations herein. An apparatus may be specially constructed for the desired purposes, or it may comprise a general purpose device selectively activated or reconfigured by a program stored in the device.

In one or more embodiments, the present embodiments are embodied in machine-executable instructions. The instructions can be used to cause a processing device, for example a general-purpose or special-purpose processor, which is programmed with the instructions, to perform the steps as described in any of the embodiments above. Alternatively, the steps as described in any of the embodiments above can be performed by specific hardware components that contain hardwired logic for performing the steps, or by any combination of programmed computer components and custom hardware components. For example, embodiments described above can be provided as a computer program product, as outlined above. In this environment, the embodiments can include a machine-readable medium having instructions stored on it. The instructions can be used to program any processor or processors (or other electronic devices) to perform a process or method according to the present exemplary embodiments. In addition, any of the above embodiments can also be downloaded and stored on a computer program product. Here, the program can be transferred from a remote computer (e.g., a server) to a requesting computer (e.g., a client) by way of data signals embodied in a carrier wave or other propagation medium via a communication link (e.g., a modem or network connection) and ultimately such signals may be stored on the computer systems for subsequent execution).

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user (or passenger), the features can be implemented on a computer with a display device, such as an LCD (liquid crystal display), or another type of monitor for displaying information to the user (or passenger), and a keyboard and an input device, such as a mouse or trackball by which the user (or passenger) can provide input to the computer.

A computer program can be a set of instructions that can be used, directly or indirectly, in a computer. The systems and methods described herein can be implemented using programming languages such as Flash™, JAVA™, C++, C, C#, Python, Visual Basic™ JavaScript™ PHP, XML, HTML, etc., or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as SOAP/HTTP may be used in implementing interfaces between programming modules. The components and functionality described herein may be implemented on any desktop operating system executing in a virtualized or non-virtualized environment, using any programming language suitable for software development, including, but not limited to, different versions of Microsoft Windows™, Apple™ Mac™, iOS™, Unix™/X-Windows™, Linux™, etc. The system could be implemented using a web application framework, such as Ruby on Rails.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The systems, modules, and methods described herein can be implemented using any combination of software or hardware elements. The systems, modules, and methods described herein can be implemented using one or more virtual machines operating alone or in combination with one other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks that form the Internet.

One or more embodiments described above may be practiced with other computer system configurations, including hand-held devices, microprocessor systems, microprocessor-based or programmable consumer electronics, minicomputers, mainframe computers, etc. Any embodiment of the detailed description may also be practiced in distributed computing environments where tasks are performed by remote processing devices that are linked through a network.

The terms "computer program medium" and "computer readable medium" may be used to generally refer to media such as but not limited to removable storage drive, a hard disk installed in hard disk drive. These computer program products may provide software to computer system. Any embodiment of the detailed disclosure may be directed to such computer program products.

References to "one embodiment," "an embodiment," "example embodiment," "various embodiments," etc., may indicate that the embodiment(s) so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the description and claims, the terms "coupled" and "connected," along with their derivatives, may be used. It should be understood that these terms may be not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm may be here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, it may be appreciated that throughout the specification terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. The terms "system" and "method" are used herein interchangeably insofar as the system may embody one or more methods and the methods may be considered as a system.

While one or more embodiments have been described, various alterations, additions, permutations and equivalents thereof are included within the scope of the detailed description.

In the description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

What we claim is:

1. A wearable device for enabling passenger interaction with an autonomous vehicle comprising:
a transceiver;
a sensor, an output of which comprises a passenger input signal;
a notification element, the notification element comprising at least one of a vibration element;
one or more processors in communication with the transceiver, the sensor, and the notification element; and
memory storing computer-executable instructions that, when executed by the one or more processors, cause the wearable device to:
receive a passenger communication signal from the autonomous vehicle;
activate the notification element based at least in part on the passenger communication signal; and
send the passenger input signal to the autonomous vehicle,
wherein the passenger input signal comprises passenger preference information, the passenger preference information comprising at least one of specified vehicle lighting levels, specified vehicle audio levels, specified music to be played in the autonomous vehicle, specified routes for the autonomous vehicle to follow, or specified ride profiles,
wherein sending the passenger input signal to the autonomous vehicle causes the autonomous vehicle to operate according to the passenger preference information,
wherein the instructions, when executed, further cause the one or more processors to determine a hand gesture based at least in part on the passenger input signal and, based at least in part on the hand gesture, at least one of summon a ride from the autonomous vehicle or cancel a ride from the autonomous vehicle; and
cause the notification element to vibrate a first number of times when the autonomous vehicle is a first distance from the wearable device and vibrate a second number of times when the autonomous vehicle is a second distance from the wearable device, the first number of times and the second number of times differing from one another, and the first distance and the second distance differing from one another.

2. The wearable device of claim 1, wherein the notification element comprises a plurality of light emitters configured to serve as fiducials to an external imaging system on the autonomous vehicle, a light emitter of the plurality of light emitters operating in at least one of infrared frequencies and visible light frequencies, and
wherein determining the hand gesture comprises receiving an output from the external imaging system.

3. The wearable device of claim 1, wherein the sensor includes a touch sensor, and the touch sensor is one of a pressure sensor, a capacitive touch sensor, a resistive touch sensor, or an inductive touch sensor.

4. The wearable device of claim 1, wherein the sensor includes at least one of an inertial measurement unit, gyroscope, or magnetometer, and wherein the hand gesture comprises raising a hand.

5. The wearable device of claim 1, wherein the autonomous vehicle is located remotely from the wearable device,
wherein one or more passenger input signals are mapped in the memory to one or more functions,
wherein the one or more functions are communicated to the autonomous vehicle, and
wherein causing the autonomous vehicle to operate according to the passenger preference information comprises causing the autonomous vehicle to operate according to the passenger preference information while remote from the wearable device.

6. The wearable device of claim 1, wherein the memory further stores instructions, that responsive to receiving the passenger communication signal from the autonomous vehicle causes the wearable device to activate the notification element, the passenger communication signal indicative of at least one of a ride from the autonomous vehicle being successfully summoned or a ride from the autonomous vehicle being successfully cancelled.

7. The wearable device of claim 1, wherein the transceiver is configured to pair with a smartphone.

8. The wearable device of claim 7, wherein the memory further stores instructions, that when executed by the one or more processors, causes the wearable device to communicate to the smartphone, over the transceiver, a request for additional data available on the smartphone and further wherein, the additional data comprises data stored in a database on the smartphone indicative of passenger information.

9. The wearable device of claim 1, wherein the wearable device is one of a necklace or cufflink.

10. A method for enabling a passenger to communicate with an autonomous vehicle, the method comprising:
generating a passenger input signal, the passenger input signal corresponding to output of a sensor located on a wearable system;
mapping, based at least in part on a hand gesture associated with the passenger input signal, one or more functions to the passenger input signal, the one or more functions comprising at least one of summoning a ride from the autonomous vehicle or canceling a ride from the autonomous vehicle;
sending the one or more functions from a transceiver of the wearable system;
receiving a passenger communication signal at the transceiver; and
activating a notification element based, at least in part, on the passenger communication signal, the notification element comprising at least one of a vibration element, a light emitter, or an audio emitter,
wherein the one or more functions further comprise at least one of changing a volume of an audio source in the autonomous vehicle, changing a music source in the autonomous vehicle, changing a lighting level in the autonomous vehicle, or changing a ride profile of the autonomous vehicle.

11. The method of claim 10, wherein the sensor comprises at least one of a touch sensor or a gesture recognition sensor, the touch sensor comprising one or more of a pressure sensor, a capacitive touch sensor, a resistive touch sensor or an inductive touch sensor, the gesture recognition sensor comprising one or more of an inertial measurement unit, a gyroscope, or a magnetometer.

12. The method of claim 10, further comprising:
pairing the wearable system, over the transceiver, with a smartphone;
requesting additional information from the smartphone;
accessing the additional information from the smartphone, wherein the additional information comprises data stored in a database on the smartphone indicative of passenger information; and
communicating the additional information to one or more of the autonomous vehicle or the wearable system.

13. The method of claim 10, wherein the one or more functions further comprise communicating a pick-up location to the autonomous vehicle,
wherein the hand gesture is raising a hand,
wherein summoning a ride comprises sending a function configured to cause the autonomous vehicle to autonomously navigate to a location proximate the wearable system, and
wherein activating the notification element comprises altering one or more of a blink rate of the light emitter, a pulse rate of the vibration element, or an audio signal of the audio emitter based at least in part on a distance between the autonomous vehicle and the wearable system.

14. The method of claim 10, wherein the autonomous vehicle is located remotely from the wearable system, and wherein the passenger communication signal is received when the one or more functions is successfully performed by the autonomous vehicle.

15. The method of claim 10, wherein the wearable system is worn on the passenger as one of a necklace or a cufflink.

16. The method of claim 11, wherein the sensor outputs a signal corresponding to a raise of a hand of the passenger according to the gesture recognition sensor.

17. The method of claim 11, wherein mapping comprises outputting a summon ride function based, at least in part, on a passenger input signal of a touch sensor activation for not less than three seconds, wherein the summon ride function, when received by an autonomous vehicle, causes the autonomous vehicle to navigate to a location proximate the wearable system.

18. A system comprising:
a wearable system having one or more processors, at least one transceiver, at least one sensor, at least one vibration element, at least one light emitting diode, and at least one audio emitter; wherein,
the sensor comprises one or more of a pressure sensor, capacitive touch sensor, resistive touch sensor, inductive touch sensor, inertial measurement unit, gyroscope, magnetometer, barometer, thermometer, or GPS receiver;
the transceiver communicates between the one or more processors and a communication network; and
memory storing computer-executable instructions that, when executed by the one or more processors, cause the system to:
create a passenger input signal, wherein the passenger input signal is based at least in part on an output from the sensor;
map the passenger input signal to one or more functions, the one or more functions comprising one or more of a summon ride function, a cancel ride function, an adjust audio function, or an adjust lighting function;

send the passenger input signal to an autonomous vehicle through the transceiver;

receive, from the transceiver, a passenger communication signal;

activate one or more of the at least one vibration element, the at least one audio emitter, or the at least one light emitting diode based, at least in part, on the passenger communication signal; and communicate information comprising passenger preference information to at least one of the autonomous vehicle or a fleet management system, the passenger preference information comprising at least one of specified vehicle lighting levels, specified vehicle audio levels, specified music to be played in the autonomous vehicle, specified routes for the autonomous vehicle to follow, and specified ride profiles, wherein the passenger preference information, when received by the autonomous vehicle, causes the autonomous vehicle to operate in accordance with the passenger preference information, and wherein the wearable system is a necklace or a cufflink.

19. The system of claim 18, wherein the passenger communication signal is generated by the autonomous vehicle in response to the autonomous vehicle successfully performing the one or more functions.

20. The system of claim 18, wherein the passenger preference information comprises a specified ride profile, the specified ride profile comprising a preferred suspension setting.

* * * * *